United States Patent
Yamanaka et al.

(10) Patent No.: US 8,037,322 B2
(45) Date of Patent: Oct. 11, 2011

(54) POWER CONSUMPTION REDUCTION DEVICE FOR DATA BACKUP

(75) Inventors: Ryoichiro Yamanaka, Kawasaki (JP);
Yuji Fukuoka, Kahoku (JP)

(73) Assignee: Fujitsu Limited, Kawasaki (JP)

( * ) Notice: Subject to any disclaimer, the term of this patent is extended or adjusted under 35 U.S.C. 154(b) by 701 days.

(21) Appl. No.: 12/037,621

(22) Filed: Feb. 26, 2008

(65) Prior Publication Data
US 2008/0229133 A1    Sep. 18, 2008

(30) Foreign Application Priority Data

Mar. 13, 2007 (JP) .................................. 2007-064050

(51) Int. Cl.
*G06F 1/00* (2006.01)
*G06F 1/26* (2006.01)

(52) U.S. Cl. ....................................................... 713/300
(58) Field of Classification Search ................... 713/300
See application file for complete search history.

(56) References Cited

U.S. PATENT DOCUMENTS

| | | | | |
|---|---|---|---|---|
| 5,204,963 A * | 4/1993 | Noya et al. | ..................... | 365/229 |
| 5,283,879 A * | 2/1994 | Carteau et al. | ..................... | 710/1 |
| 5,426,690 A * | 6/1995 | Hikuma et al. | ............... | 455/411 |
| 5,905,994 A | 5/1999 | Hori et al. | | |
| 6,738,851 B2 * | 5/2004 | Lin | ............... | 710/302 |
| 7,131,013 B2 * | 10/2006 | Sasakura et al. | ............... | 713/300 |
| 2004/0236908 A1 | 11/2004 | Suzuki et al. | | |

FOREIGN PATENT DOCUMENTS

| | | |
|---|---|---|
| JP | 05-333969 | 12/1993 |
| JP | 9-160838 | 6/1997 |
| JP | 2004-348876 | 12/2004 |

* cited by examiner

*Primary Examiner* — Mohammed Rehman
(74) *Attorney, Agent, or Firm* — Staas & Halsey LLP (57) ABSTRACT

A power reducer for data backup stops a power supply one after another for each memory whose backup has been completed, thereby reducing power consumption for battery during the backup lengthening a data backup time. The power reducer for data backup in a device includes an external power supply unit supplying power to the device, auxiliary power supply unit charging based upon the power supply from the external power supply unit and supplying auxiliary power to the device when the power from the external power supply unit is stopped, a cache memory having first and second memory units and recording a part of data stored in a storage medium, and a controller controlling power from the auxiliary power supply unit to the device and stopping power to the first or second memory unit one after another.

5 Claims, 7 Drawing Sheets

POWER CONSUMPTION REDUCTION DEVICE FOR DATA BACKUP

CROSS-REFERENCE TO RELATED APPLICATIONS

This application is related to and claims priority to Japanese patent application no. 2007-064050 filed on Mar. 13, 2007 in the Japan Patent Office, and incorporated by reference herein.

BACKGROUND

1. Field

The embodiments relate to a power reduction device for backing up data stored in a cache memory and the like.

2. Description of the Related Art

In recent years, with an increase in capacity of storage devices such as a magnetic disk device (HDD) and a magneto-optic disk device (MO), a capacity of a cache memory that transmits and receives data to/from such devices has been increasing. Such a cache memory is incorporated in, for example, a disk array device, and data in the memory in case of power failure is saved in, for example, a disk device.

Figure 6:
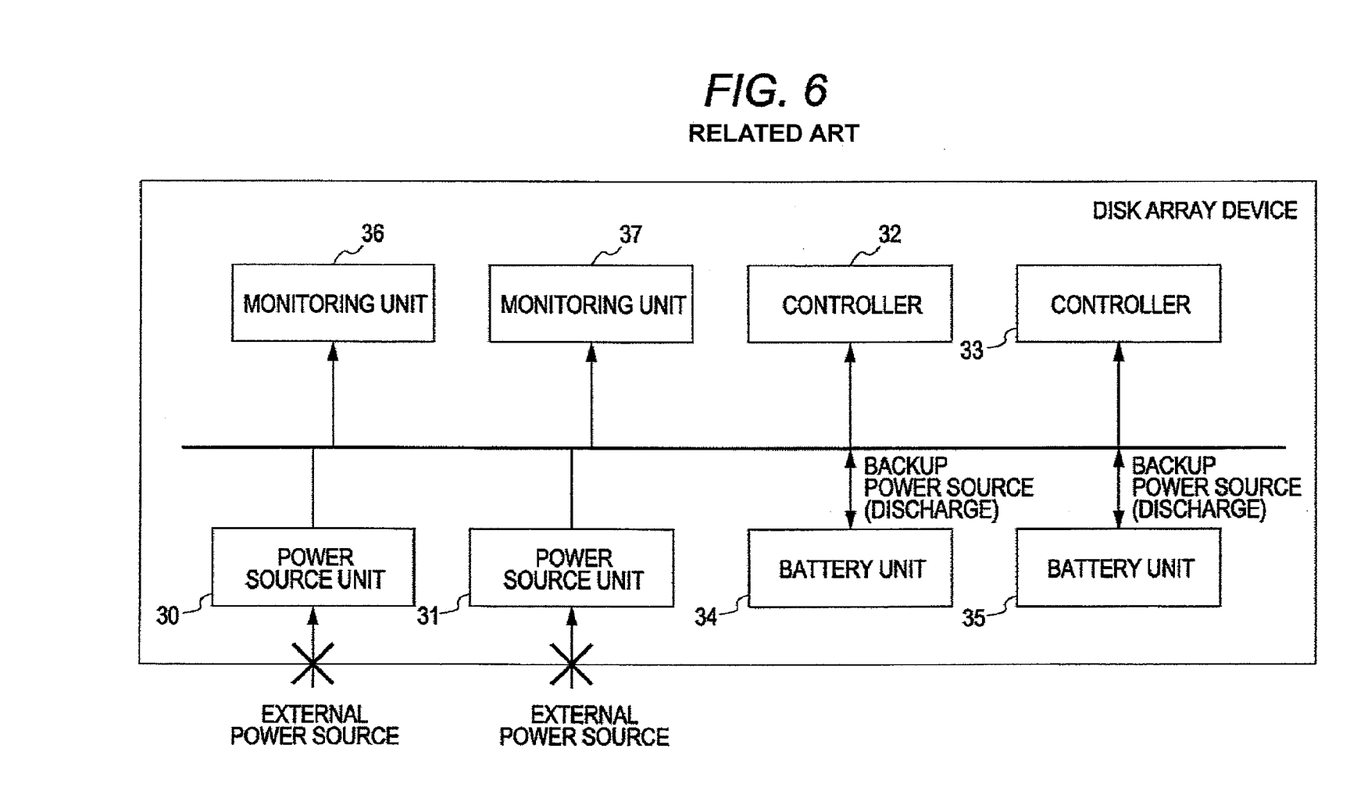
FIG. 6 is a configuration diagram of a known disk array device.

FIG. 6 is a diagram for explaining the aforementioned process in case of power failure. Usually, a power source is supplied from the outside of a device to power source units 30 and 31, and the power source is supplied to controllers 32 and 33 in the device to charge battery units 34 and 35. For example, in case of power failure in this state, a power supply from the outside is stopped, and consequently, the power supply to the power source units 30 and 31 is lost.

Monitoring units 36 and 37 detect this state, notify the controller 32 and 33 of generation of the power failure, and instruct the battery units 34 and 35 to supply (discharge) a backup power source.

Figure 7:
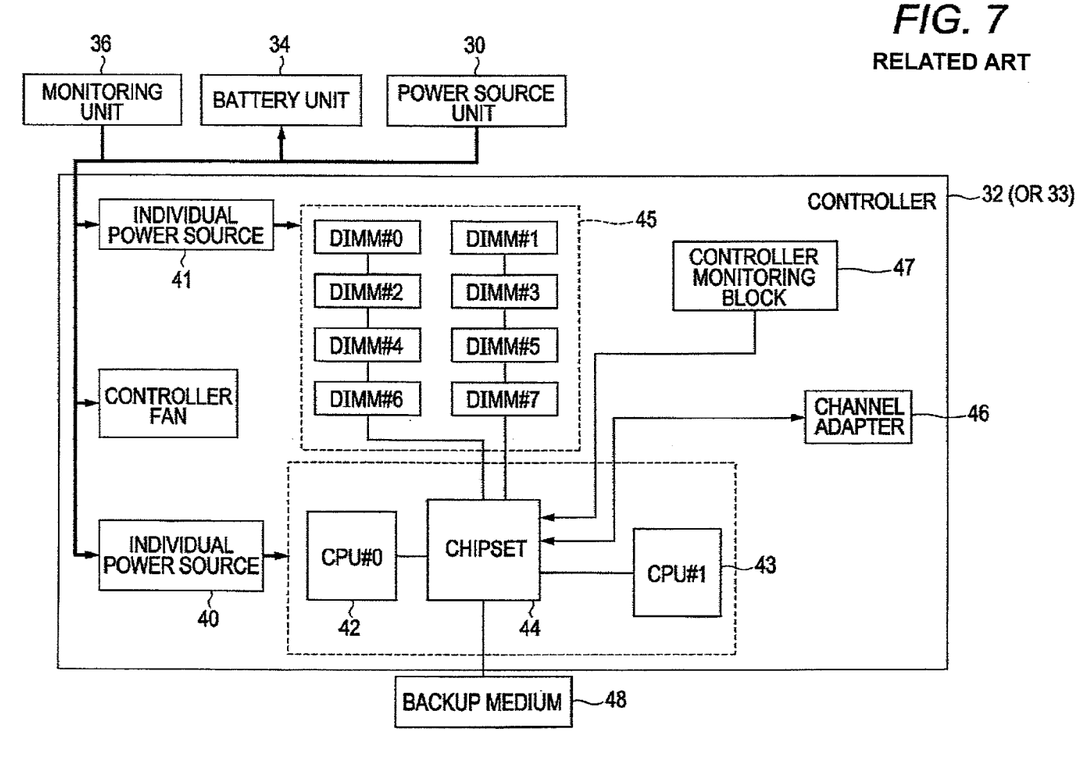
FIG. 7 is a circuit diagram of a controller for use in the known disk array device.

FIG. 7 shows a circuit diagram of the aforementioned controller 32 (or 33) Usually, the power source unit 30 (or 31) supplies the power source to individual power sources 40 and 41 in the controller 32 (or 33). However, in case of the aforementioned power failure, the power source is supplied from the battery unit 34 (or 35). For example, the individual power source 40 supplies the power source to central processing units (referred to as CPU) 42 and 43 and a chipset 44, and the individual power source 41 supplies the power source to a dual in-line memory module (referred to as DIMM) 45 that is a cache memory.

In addition, a channel adapter 46 shown in the same drawing transmits and receives data via a communication circuit to/from a host apparatus such as a personal computer, and a controller monitoring block 47 monitors a state in the controller 32 (or 33). Furthermore, a backup medium 48 stores data of the DIMM 45 in case of power failure.

However, in the known power supply method for data backup, a power is supplied to controllers etc. even in case of power failure; and consequently, consuming power is not changed from normal consumption. Therefore, when data save time in case of power failure is lengthened, a large power is required, which leads to, for example, upsizing of a battery unit and an increase in number of the battery units.

SUMMARY

In accordance with an aspect of an embodiment, a power reduction device for data backup that includes external power supply unit for supplying a power source from the outside to components of the device, auxiliary power source unit which charges on the basis of the power source supplied from the external power supply unit, the auxiliary power source unit supplying a power source to the device when the power supply from the external power supply unit is stopped, a cache memory which has first and second memory units and records a part of data stored in a storage medium, and control unit for performing the power supply from the auxiliary power source unit to the components of the device, and stopping power supply to the first or second memory unit one after another in the order of backup completion when data of the cache memory is backed up in the recording medium.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

An embodiment will be described below with reference to the drawings.

Figure 2:
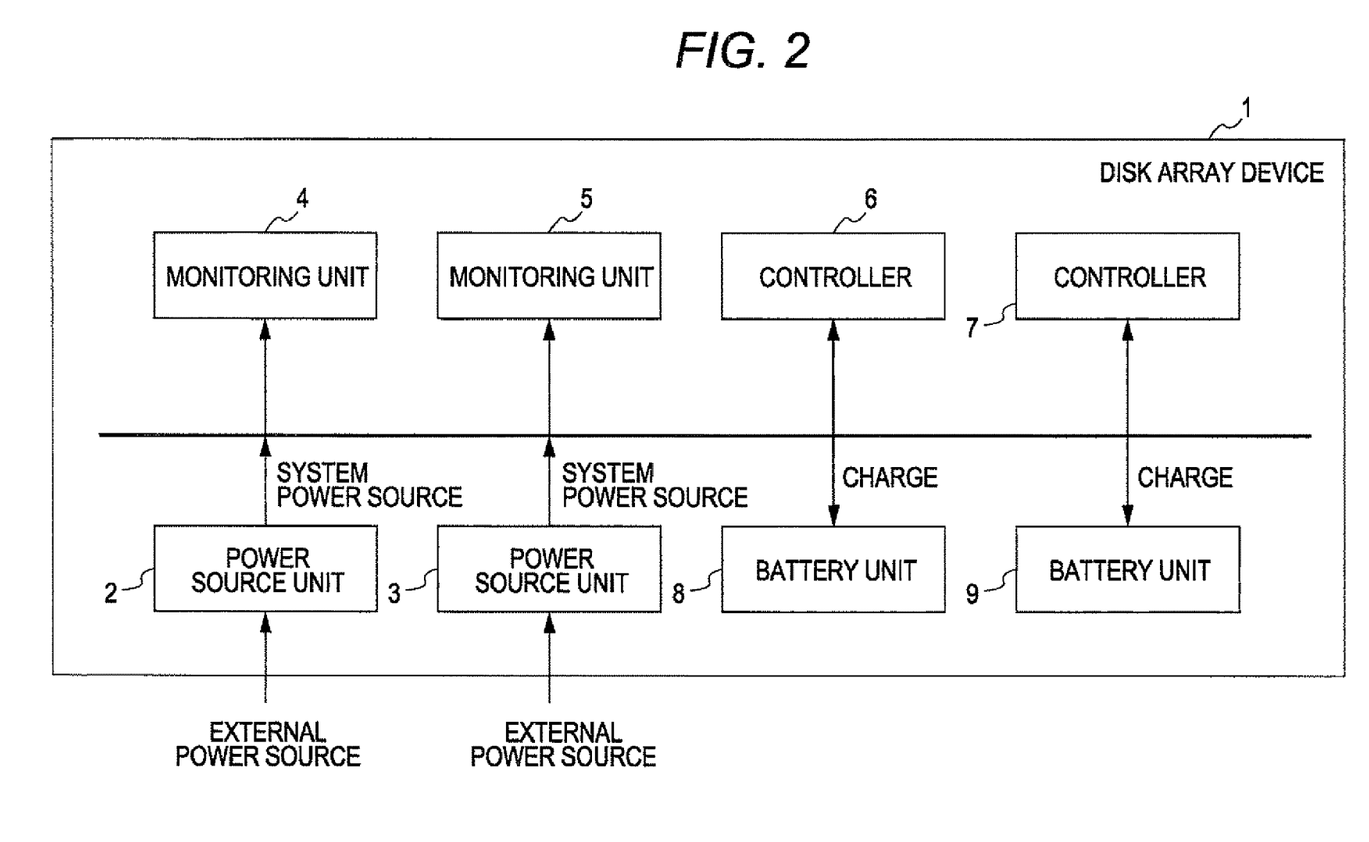
FIG. 2 is a configuration diagram of a disk array device for explaining the present embodiment.

FIG. 2 is a diagram for explaining the embodiment and a configuration diagram of a disk array device which incorporates a cache memory. A disk array device 1 is connected to a host apparatus such as a personal computer via a network line.

In the same drawing, the disk array device 1 is composed of power source units 2 and 3, monitoring units 4 and 5, controllers 6 and 7, and battery units 8 and 9. According to an aspect of an embodiment, the disk array device 1 has two controllers 6 and 7, each of which is connected to a hard disk (HD) to be described later. For example, the disk array device 1 may be provide with not less than three controllers which transmit and receive data to/from more hard disks (HD).

A power is supplied from an external power source to the power source unit 2 (or 3), and the power source unit 2(or 3) supplies the power to the components of the device on the basis of the power supply. Furthermore, the monitoring unit 4(or 5) monitors the power source unit 2 (or 3), and when the power supply from the outside continues a state at 0 V for a constant time, for example, the monitoring unit detects a power failure, performs instructions accordingly.

The battery unit 8 (or 9) charges while the external power source is supplied, and in case of power failure, the power charged based on the instruction from the monitoring unit 4 (or 5) is supplied to the disk array device 1. The power source is used for backing up data in cache memories provided in the controllers 6 and 7. The controllers 6 and 7 (controller 6 is shown below on behalf of the controllers) mount CPUs, a channel adapter, a chipset, fully buffered DIMMs (referred to as FB-DIMMs), a controller monitoring block, and the like.

Figure 1:
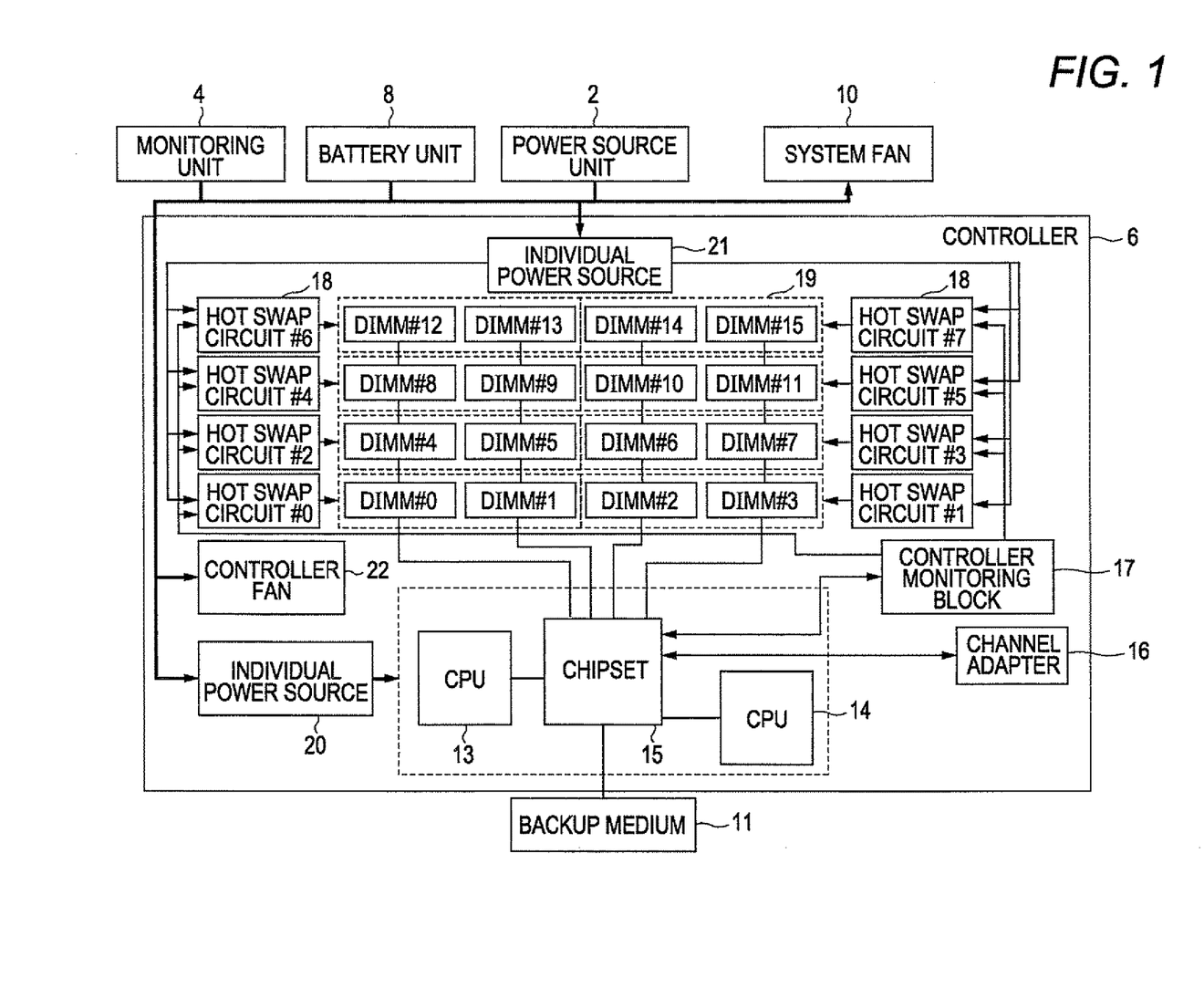
FIG. 1 is a circuit diagram of a controller for use in an embodiment.

FIG. 1 shows a specific circuit diagram of the controller 6. As shown in FIG. 1, the aforementioned power source unit 2, monitoring unit 4, and battery unit 8 are connected to the controller 6. Although not shown in FIG. 2, a system fan 10 is also connected to the disk array device 1 in order to adjust temperature in the device, and a power is supplied to the system fan 10 from the power source unit 2.

A backup medium 11 is also connected to the controller 6. The backup medium 11 is a hard disk (HD), for example.

The controller 6 is composed of CPUs 13 and 14, a chipset 15, a channel adapter 16, a controller monitoring block 17, a hot swap circuit 18, and FB-DIMMs 19. Furthermore, individual power sources 20 and 21 are provided in the controller 6, so that a power source is supplied from the power source unit 2 for usual time and a power source is supplied from the battery unit 8 for data backup in case of power failure.

The individual power source 20 supplies a power source to the aforementioned CPUs 13 and 14 and chipset 15, and the individual power source 21 supplies a power source to the hot swap circuits 18 (FB-DIMMs 19). A controller (system) fan 22 is also provided in the controller 6 to adjust temperature of the inside of the controller 6.

The CPUs 13 and 14 perform different control respectively. For example, the CPU 13 performs cache control between the FB-DIMMs 19 and the hard disk (HD) 11, and the CPU 14 controls the channel adapter 16 and the like. The channel adapter 16 control transmission and reception of data to/from a host apparatus connected via a difference network line. Further, the controller monitoring block 17 instructs the power supply/non-supply to the hot swap circuit 18 on the basis of control of the chipset 15.

The hot swap circuits 18 are capable of cutting off the power supply to the FB-DIMMs 19 in a state where the power source is supplied from the individual power source 21, and are composed of eight hot swap circuits 18 (#0 to #7) in response to arrangement of the FB-DIMMs 19. The FB-DIMMs 19 are composed of sixteen DIMMs 19 (#0 to #15), which are composed of eight sets of memories that make a pair of DIMMs 19 (#0 and #1), 19 (#2 and #3), 19 (#4 and #5), 19 (#6 and #7), 19 (#8 and #9), 19 (#10 and #11), 19 (#12 and #13), and 19 (#14 and #15), respectively.

Figure 3:
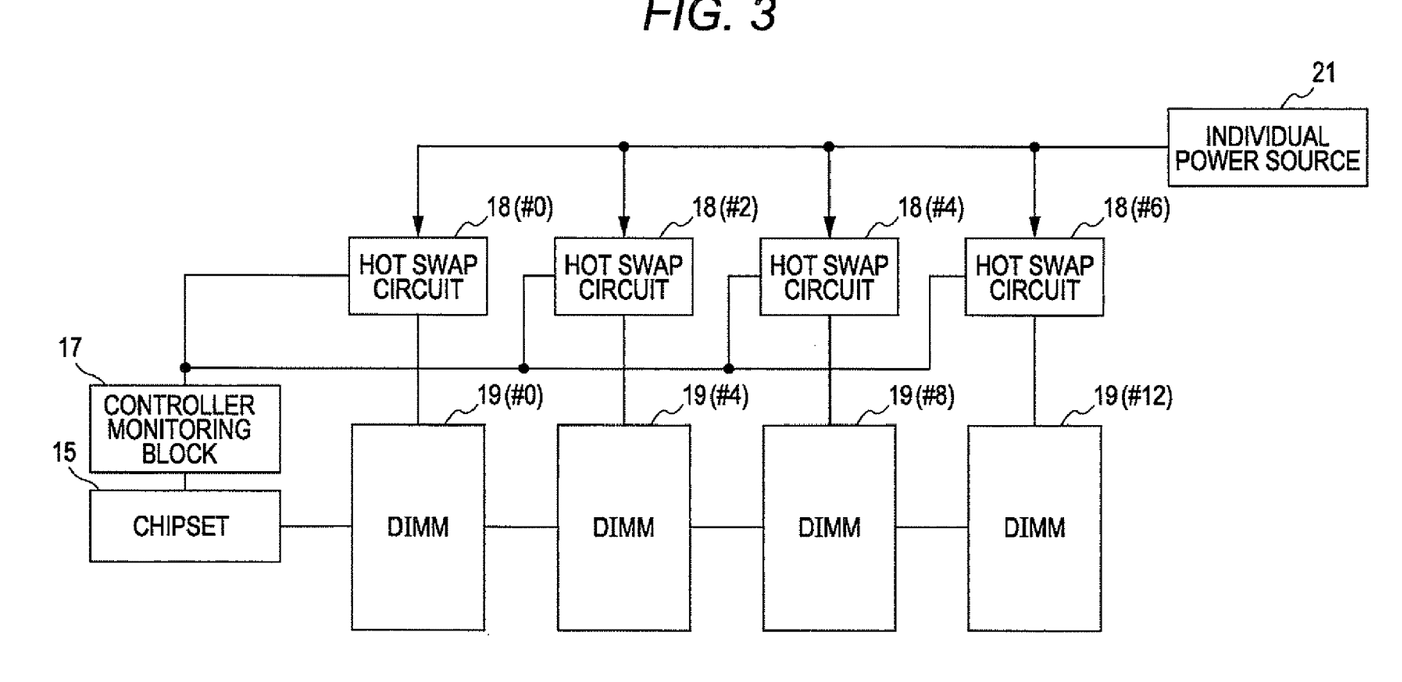
FIG. 3 is a diagram showing a specific connection configuration of hot swap circuits and DIMMs to which a power source is supplied from the hot swap circuits.

Then, the hot swap circuit 18 (#0) supplies the power source to the DIMMs 19 (#0 and #1) that are paired with the hot swap circuit 18 (#0), and the hot swap circuit 18 (#1) supplies the power source to the DIMMs 19 (#2 and #3). Hereinafter, as in the above manner, the power source is supplied from the hot swap circuit 18 (#2) to the DIMMs 19 (#4 and #5); from the hot swap circuit 18 (#3) to the DIMMs 19 (#6 and #7); . . . , and from the hot swap circuit 18 (#7) to the DIMMs 19 (#14 and #15). In the aforementioned configuration, FIG. 3 shows a specific connection configuration of DIMMs 19 (#0), 19 (#4), 19 (#8), and 19 (#12) to which the power source are respectively supplied from the hot swap circuit 18 (#0), 18 (#2), 18 (#4), and 18 (#6), for example. That is, the power source is supplied to the DIMM 19 (#0) from the individual power source 21 via the hot swap circuit 18 (#0). The power source is supplied to the DIMM 19 (#4) from the individual power source 21 via the hot swap circuit 18 (#2). The power source is supplied to the DIMM 19 (#8) from the individual power source 21 via the hot swap circuit 18 (#4). The power source is supplied to the DIMM 19 (#12) from the individual power source 21 via the hot swap circuit 18 (#6). Although not shown in the drawing, the power source is supplied to other DIMMs 19 in the same manner.

Figure 4:
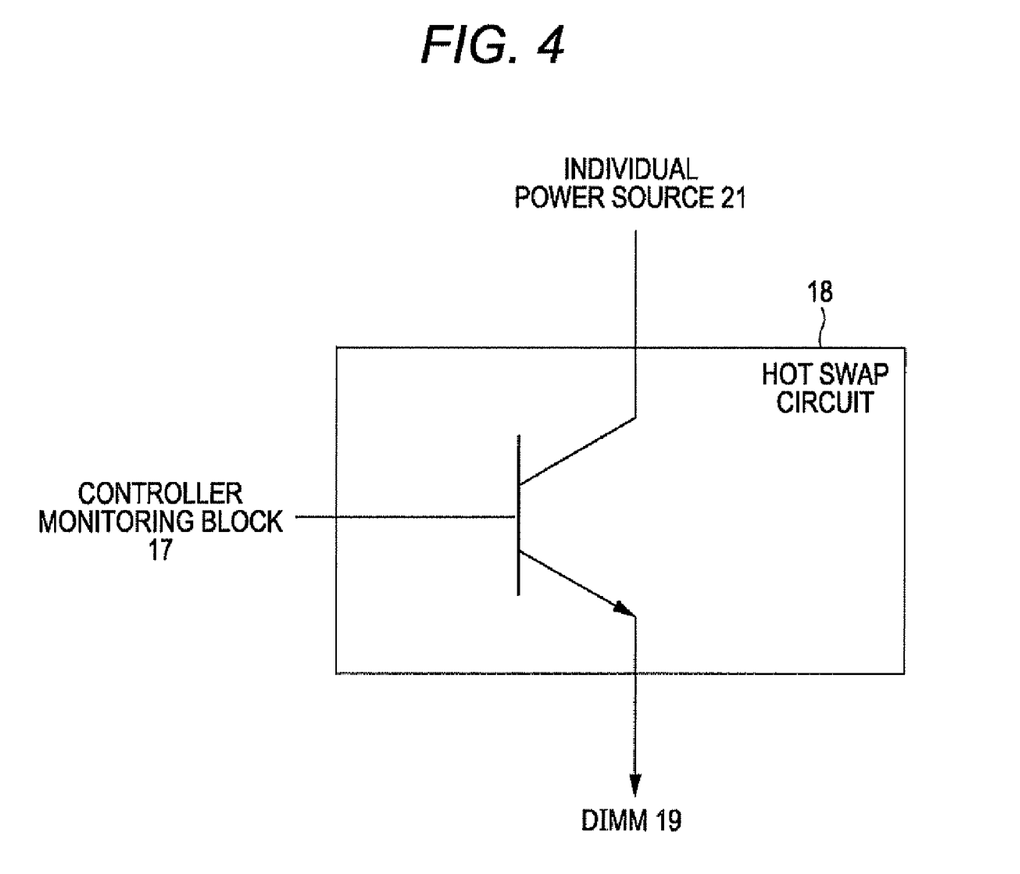
FIG. 4 is a schematic diagram of the hot swap circuit.

Furthermore, an advanced memory buffer (referred to as AMB) is mounted in each of the DIMM 19 (#0) to 19 (#15), and a data save process from the DIMMs 19 to the backup medium 11 is performed while performing data buffering. FIG. 4 is a diagram showing a schematic configuration of the hot swap circuit 18.

In the aforementioned configuration, the processing operation of the embodiment will be described below.

Usually, the controller 6 transmits and receives data via the channel adapter 16 to/from a host apparatus, performs cache control with FB-DIMMs under the control of the chipset 15, and stores necessary data, for example, backup data, in a data disk (not shown) in the hard disk (HD) 11.

Figure 5:
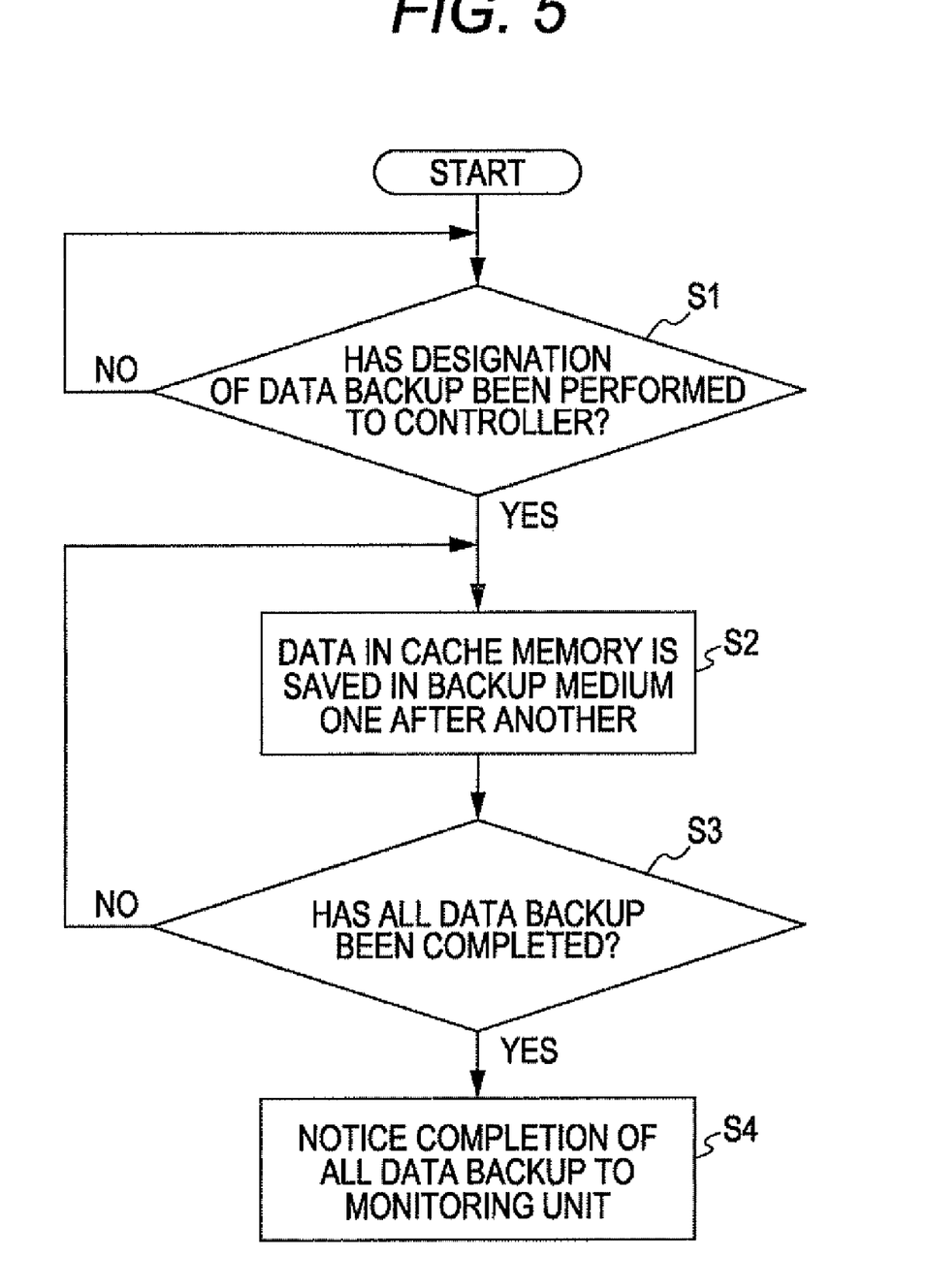
FIG. 5 is a flow chart for explaining a process of the present embodiment.

At the same time, the controller 6 always confirms the instruction from the monitoring unit 4 in accordance with a flow chart shown in FIG. 5. That is, first, it is determined whether or not the monitoring unit 4 has instructed the controller 6 to perform data backup (operation (referred to as S below) 1). This instruction is output to the controller 6 when the monitoring unit 4 detects generation of a power failure.

In this case, unless the instruction has been sent from the monitoring unit 4, the process continues a state where the instruction from the monitoring unit 4 is waited (NO in S1). On the other hand, if in a power failure state, the monitoring unit 4 has instructed the controller 6 to perform data backup (YES in S1), data in the DIMMs 19 is saved in the backup medium 11 (hard disk (HD)) (S2). At this time, the monitoring unit 4 instructs the battery unit 8 to supply a power source, so that the disk array device 1 is driven by the power source supplied from the battery unit 8.

The data backup of the DIMMs 19 is executed in the order of the DIMMs 19 (#15 and #14)→DIMMs 19 (#13 and #12) →DIMMs 19 (#11 and #10)→ . . . DIMMs 19 (#1 and #0). For example, in the circuit shown in FIG. 3, first, data of the DIMM 19 (#12) is sent to the chipset 15 via the DIMMs 19 (#8), 19 (#4) and 19 (#0), and is saved in the backup medium 11.

Next, data of the DIMM 19 (#8) is sent to the chipset 15 via 19 (#4) and 19 (#0), and is saved in the backup medium 11. Afterward, data of the DIMM 19 (#4) and data of the DIMM 19 (#0) are saved in the backup medium 11 one after another.

The same holds for other DIMMs 19. For example, in the case of the DIMMs 19 (#13), 19 (#9), 19 (#5), and 19 (#1), data of the DIMM 19 (#13) is first saved in the backup medium 11, data of the DIMM 19 (#9) is then saved in the backup medium 11, and afterward, data of the DIMM 19 (#5) and data of the DIMM 19 (#1) are saved in the backup medium 11. Furthermore, the saved data are stored in, for example, a system disk of the backup medium 11 (hard disk (HD)).

During this time, the chipset 15 stops the power supply one after another to the DIMM 19 in which the backup has been completed. Specifically, the chipset 15 sends a control signal to the controller monitoring block 17, and an instruction signal of power supply stop is sent from the controller monitoring block 17 to the associated hot swap circuit 18.

For example, upon completion of saving of data recorded in the DIMM 19 (#15) and 19 (#14), the instruction signal of the power supply stop is sent to the hot swap circuit 18 (#7), and consequently, the power supply to these DIMMs 19 is stopped. Similarly, upon completion of saving of data recorded in the DIMM 19 (#13) and 19 (#12), the instruction signal of the power supply stop is sent to the hot swap circuit 18 (#6), and consequently, the power supply to these DIMMs 19 is stopped. Then, upon completion of saving of data recorded in the DIMM 19 (#11) and 19 (#10), the instruction signal of the power supply stop is sent to the hot swap circuit 18 (#5), and consequently, the power supply to the DIMMs 19 is stopped.

Hereinafter, as in the above manner, the data backup process is executed one after another (NO in S3), and if all data backup process has been completed (YES in S3), the completion of the data backup process is noticed to the monitoring unit 4 (S4).

Such control can gradually reduce power to be supplied from the hot swap circuits 18 to the DIMMs 19, and reduction in power for the data backup can be achieved as a whole. Therefore, power consumption of the battery unit 8 is reduced, and, for example, in case of using the battery unit 8 having the same capacity, a data backup time can be lengthened.

The monitoring unit 4 in which the completion notice of the backup process is received from the controller 6 afterward instructs each unit in the disk array device 1 to be powered off, and finally, instructs the battery unit 8 to stop the discharge process.

In the aforementioned process, in the case where cache data is not recorded in the associated DIMM 19, the monitoring unit 4 instructs to stop the power supply to the associated hot swap circuit 18 without performing a process for saving data of the associated DIMM 19 when the data backup is performed.

Although the circuit of the controller 6 has been described in the above description, the same process is also performed to the circuit of the controller 7. The embodiments are implemented in software and/or computing hardware. Further, the embodiment operations and/or components can be provided in any combinations thereof. For example, any number of memory modules can be provided and arranged in any combinations (e.g., pairs, etc.) with corresponding respective memory power supply controllers, such as (without limitation) the hot swap circuits 18.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A power reduction apparatus for data backup in a device, comprising:
   external power supply unit that supplies a power source to components of the device;
   auxiliary power source unit that charges based upon the power source supplied from the external power supply unit and supplies an auxiliary power source to the device when the power supply from the external power supply unit is stopped;
   a cache memory which has first and second memory units and records a part of data stored in a storage medium; and
   a controller that controls:
      backup of data in the first and second memory units in a predetermined order, auxiliary power supply from the auxiliary power source unit to the first and second memory units, and
      stopping of the auxiliary power supply to the first or second memory unit one after another in the predetermined order of backup of data when data of the cache memory is backed up in the storage medium.

2. The power reduction device for data backup according to claim 1, wherein the first and second power supply units are hot swap circuits.

3. The power reduction device for data backup according to claim 1, wherein the cache memory is composed of FB-DIMMs, and the device further comprises a chipset controlling data access to the FB-DIMMs.

4. A method of reducing power consumption during data backup in a device, comprising:
   storing a part of storage medium data in a cache memory having first and second memory units;
   controlling backup of data in the first and second memory units in a predetermined order,
   supplying auxiliary power supply from an auxiliary power source unit to the first and second memory units, when external power source to the device is stopped; and
   stopping the auxiliary power supply to the first or second memory unit in the predetermined order of backup of data when data of the cache memory is backed up in the storage medium.

5. A non-transitory computer readable recording medium storing a program for reducing power consumption during data backup in a device including an external power supply unit supplying a power source to components of the device, an auxiliary power source unit charging based upon the power source supplied from the external power supply unit and supplying an auxiliary power supply to the device when the power supply from the external power supply unit is stopped and a cache memory having first and second memory units and recording a part of data stored in a storage medium, according to operations comprising: controlling backup of data in the first and second memory units in a predetermined order;
   supplying the auxiliary power supply from the auxiliary power source unit to the first and second memory units, when the power source from the external power supply unit is stopped; and
   stopping the auxiliary power supply to the first or second memory unit in the predetermined order of backup of data when data of the cache memory is backed up in the storage medium.

* * * * *